United States Patent
Kimura

(10) Patent No.: US 11,190,693 B2
(45) Date of Patent: Nov. 30, 2021

(54) IMAGE PICKUP APPARATUS AND ITS CONTROL METHOD THAT CORRECTS IMAGE BLURS BY MOVING IMAGE SENSOR

(71) Applicant: CANON KABUSHIKI KAISHA, Tokyo (JP)

(72) Inventor: Masafumi Kimura, Kawasaki (JP)

(73) Assignee: CANON KABUSHIKI KAISHA, Tokyo (JP)

(*) Notice: Subject to any disclaimer, the term of this patent is extended or adjusted under 35 U.S.C. 154(b) by 0 days.

(21) Appl. No.: 16/924,994

(22) Filed: Jul. 9, 2020

(65) Prior Publication Data

US 2021/0014423 A1 Jan. 14, 2021

(30) Foreign Application Priority Data

Jul. 10, 2019 (JP) .............................. JP2019-128135

(51) Int. Cl.
*H04N 5/232* (2006.01)
*H04N 5/378* (2011.01)
*H04N 5/225* (2006.01)
*G02B 27/64* (2006.01)

(52) U.S. Cl.
CPC ........ *H04N 5/23287* (2013.01); *G02B 27/646* (2013.01); *H04N 5/2254* (2013.01); *H04N 5/378* (2013.01)

(58) Field of Classification Search
CPC .. H04N 5/23287; H04N 5/2254; H04N 5/378; G02B 27/646
See application file for complete search history.

(56) References Cited

U.S. PATENT DOCUMENTS

2016/0316121 A1* 10/2016 Park ........................ G02B 7/08
2018/0241926 A1* 8/2018 Nishimura ........... H04N 5/2327

FOREIGN PATENT DOCUMENTS

JP 2011-221519 A 11/2011

OTHER PUBLICATIONS

Translation of Japanese Pub. No. JP6381236B2, Aug. 29, 2018 (Year: 2018).*

* cited by examiner

*Primary Examiner* — Nicholas G Giles
(74) *Attorney, Agent, or Firm* — Cowan, Liebowitz & Latman, P.C.

(57) ABSTRACT

An image pickup apparatus includes an image sensor configured to capture an object image, and a controller by controlling energizing an actuator for an image stabilization operation that moves the image sensor. The controller switches an energization method for the actuator between a first energization method and a second energization method that has a response distortion of an actuator larger and a ripple current smaller than those of the first energization method, controls energizing the actuator by the first energization method in a first state that does not read a signal out of the image sensor during a charge accumulation of the image sensor, and controls energizing the actuator by the second energization method in a second state that reads the signal out of the image sensor after the charge accumulation.

8 Claims, 14 Drawing Sheets

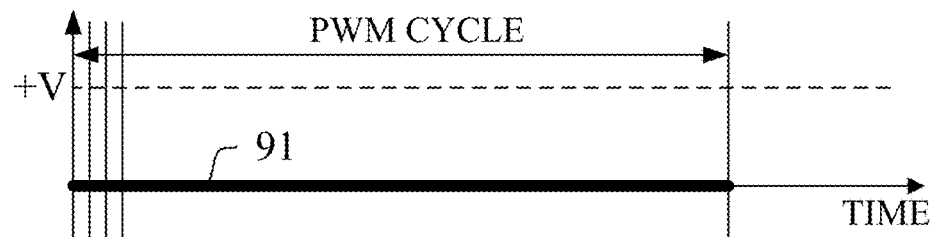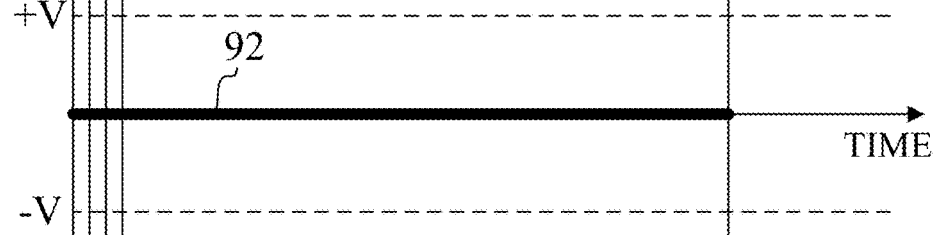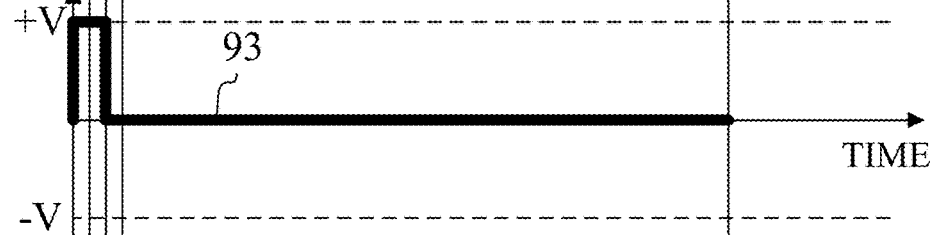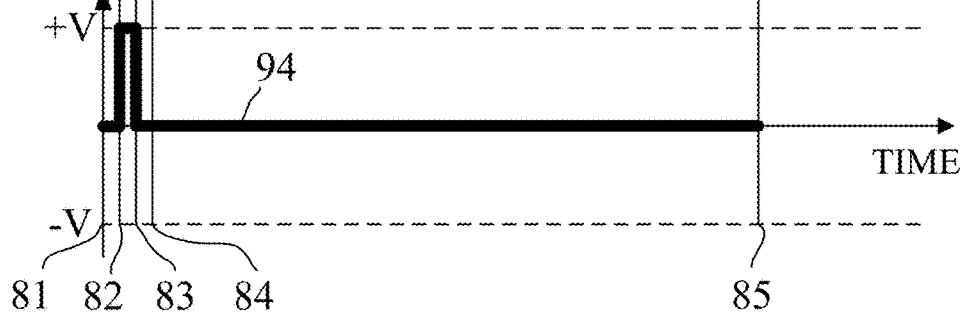

IMAGE PICKUP APPARATUS AND ITS CONTROL METHOD THAT CORRECTS IMAGE BLURS BY MOVING IMAGE SENSOR

BACKGROUND OF THE INVENTION

Field of the Invention

The present invention relates to an image pickup apparatus that reduces (corrects) an image blur by moving an image sensor.

Description of the Related Art

Since this type of image pickup apparatus moves an image sensor using an electromagnetic actuator, such as a voice coil motor (VCM), the image quality generated by using an output from the image sensor may deteriorate due to the influence of magnetic noise generated from the electromagnetic actuator.

Japanese Patent Laid-Open No. 2011-221519 discloses a method of switching a control of an image stabilization unit according to the brightness of an object (image). More specifically, an analog control that can suppress a noise generation is used when the object is dark and thus the output from the image sensor is to be greatly amplified, and a digital control is used when the object is bright.

The noise generation can be thus suppressed by the analog control of the image stabilization unit, but needs a consumption power higher than that with only the digital control.

SUMMARY OF THE INVENTION

The present invention provides an image pickup apparatus that can obtain a high image stabilization performance while reducing noises in the image.

An image pickup apparatus according to one aspect of the present invention includes an image sensor configured to capture an object image, and one or more processors and/or circuitry which functions as a controller by controlling energizing an actuator for an image stabilization operation that moves the image sensor. The controller switches an energization method for the actuator between a first energization method and a second energization method that has a response distortion of an actuator larger and a ripple current smaller than those of the first energization method, controls energizing the actuator by the first energization method in a first state that does not read a signal out of the image sensor during a charge accumulation of the image sensor, and controls energizing the actuator by the second energization method in a second state that reads the signal out of the image sensor after the charge accumulation.

A control method of the above image pickup apparatus and a storage medium storing the control method also constitute another aspect of the present invention.

Further features of the present invention will become apparent from the following description of exemplary embodiments with reference to the attached drawings.

BRIEF DESCRIPTION OF THE DRAWINGS

FIGS. 9A to 9E explain an illustrative waveform and distortions in the on-short energization method.

DESCRIPTION OF THE EMBODIMENTS

Figure 2A:
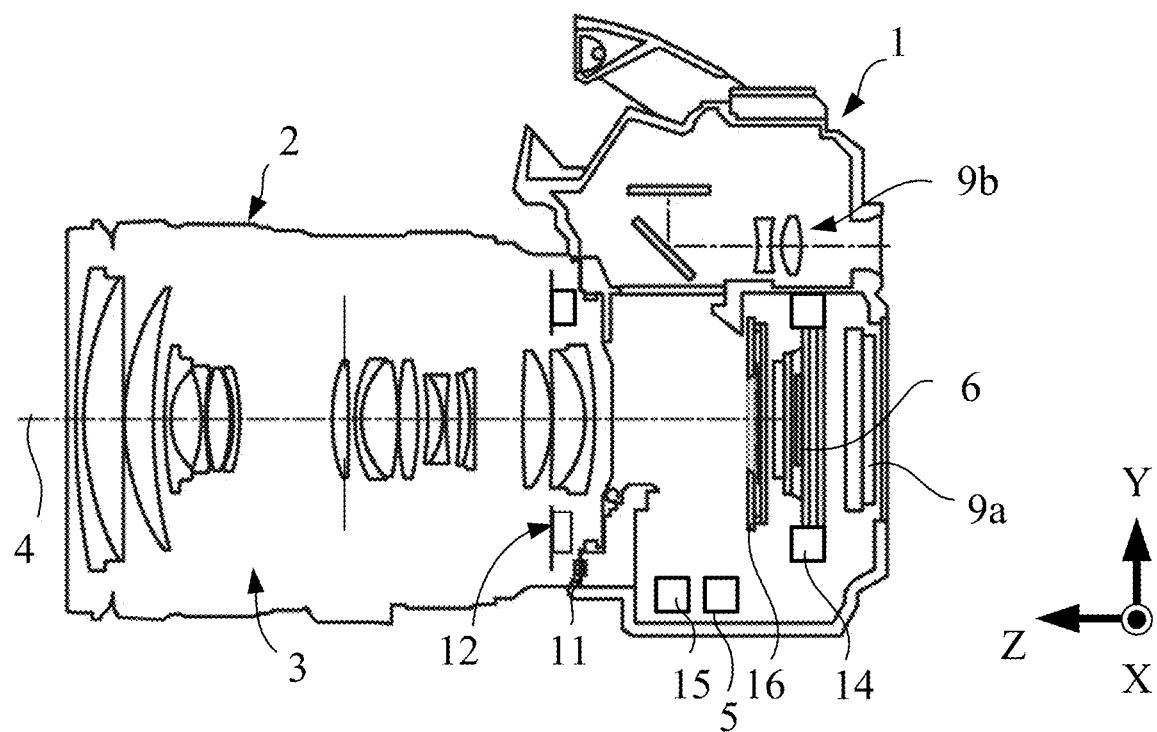
FIGS. 2A and 2B are a sectional view and a block diagram illustrating an electric configuration of the image pickup apparatus according to the embodiment.
Figure 2B:
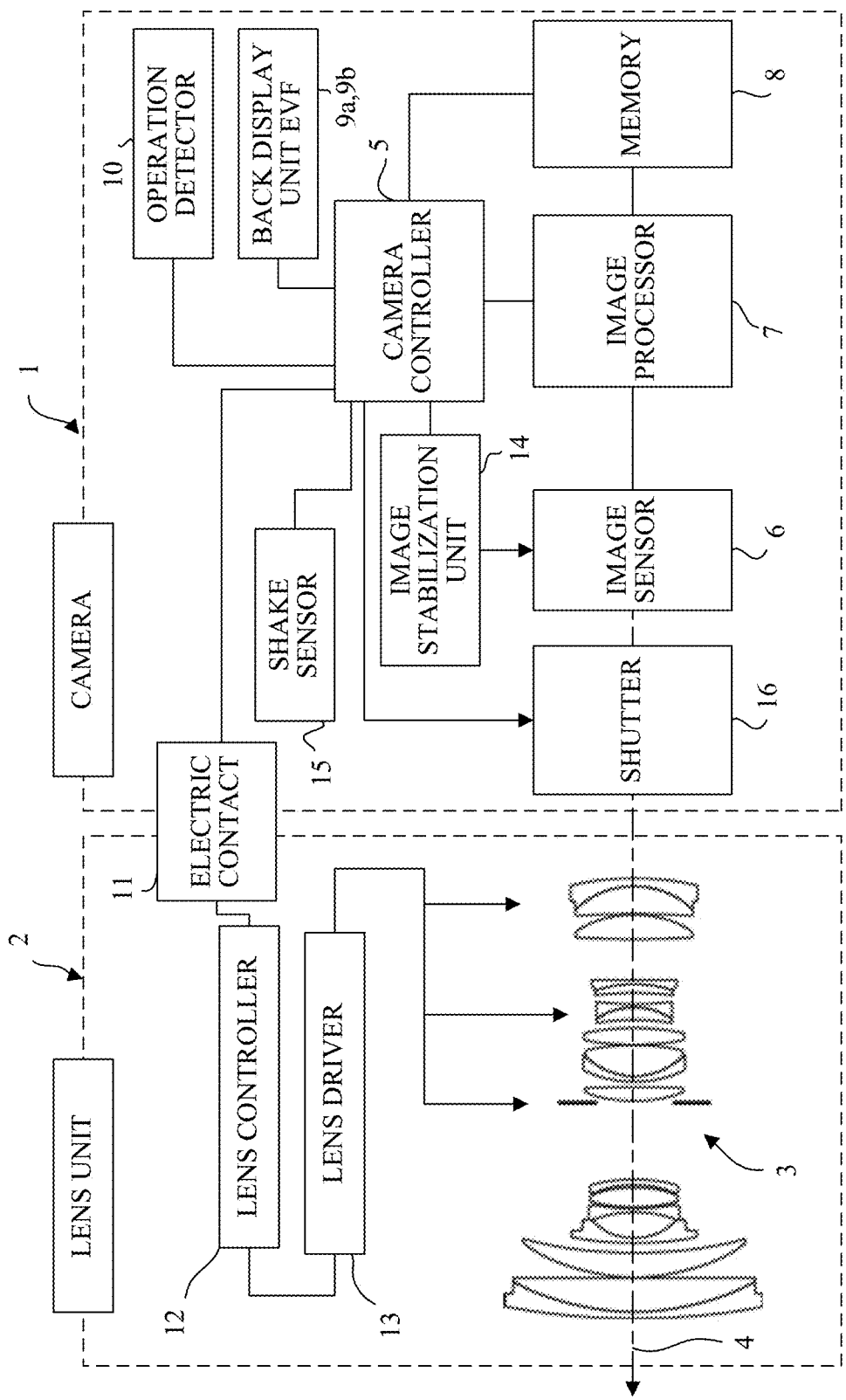

Referring now to the accompanying drawings, a description will be given of embodiments according to the present invention. FIG. 2A illustrates a section of an image pickup apparatus 1 according to one embodiment of the present invention, and FIG. 2B illustrates an electrical configuration of the image pickup apparatus 1. In FIGS. 2A and 2B, the same components are designated by the same reference numerals.

In FIG. 2A, an interchangeable lens unit 2 is detachably (interchangeably) attached to the image pickup apparatus (referred to as a camera hereinafter) 1. The interchangeable lens unit 2 has an image pickup optical system 3 including a plurality of lenses and an aperture stop (diaphragm). The camera 1 has a shutter 16, an image sensor 6, an image stabilization unit 14, a shake sensor 15, a rear display unit 9a, and an electronic viewfinder (EVF) 9b. A camera controller (controller) 5 provided in the camera 1 communicates with a lens controller 12 provided in the interchangeable lens unit 2 via an electrical contact 11 and supplies power to the interchangeable lens unit 2.

In FIG. 2B, the image sensor 6 photoelectrically converts (captures) the object image formed by the image pickup optical system 3. An exposure amount of the image sensor 6 is controlled by the shutter 16 controlled by the camera controller 5. An image processor 7 performs image processing, such as the A/D conversion, the white balance adjustment, the gamma correction, and the interpolation calculation, for an signal output from the image sensor 6 to generate an image (data). The image is recorded in a nonvolatile memory 8 or displayed on the rear display 9a or EVF 9b. The operations of the image processor 7, the rear display 9a and the EVF 9b are controlled by the camera controller 5.

In the camera 1, the shake sensor 15 includes a gyro sensor or the like, and detects camera shakes such as camera shakes around an optical axis 4 of the image pickup optical system 3 in the vertical and horizontal (pitch and yaw) directions, and outputs a shake signal to the camera controller 5. The image stabilization unit 14 holds the image sensor 6 so that the image sensor 6 is movable (shiftable) in the direction orthogonal to the optical axis 4 and rotatable around the optical axis 4, and performs an image stabilizing operation for correcting image blurs by shifting and rotating the image sensor 6 by a VCM as an electromagnetic actuator described later. The camera controller 5 controls driving of the VCM according to the shake amount and rotational shake amount in the pitch and yaw directions acquired from the shake signal from the shake sensor 15. The detailed configuration and operation of the image stabilization unit 14 will be described later.

An operation detector 10 detects an operation of an operation member such as a shutter button or a mode dial. The camera controller 5 performs imaging preparation operations, such as autofocus and auto-exposure controls, according to the S1 signal output from the operation detector 10 when the shutter button is half-pressed, and preforms imaging and recording operations according to the S2 signal output when the shutter button is fully pressed. The camera controller 5 sets an image capturing mode, such as a still image capturing mode, a motion image capturing mode, and an image stabilization mode, in accordance with the signal output from the operation detector 10 by operating the mode dial.

In the image stabilization mode, when the camera controller 5 drives the image stabilization unit 14 to perform the image stabilization operation, it acquires a shake signal from the shake sensor 15 and energizes the VCM based on the shake signal. The energization method for the VCM includes a first energization method and a second energization method which will be described later, and details of them will be described later.

Figure 3:
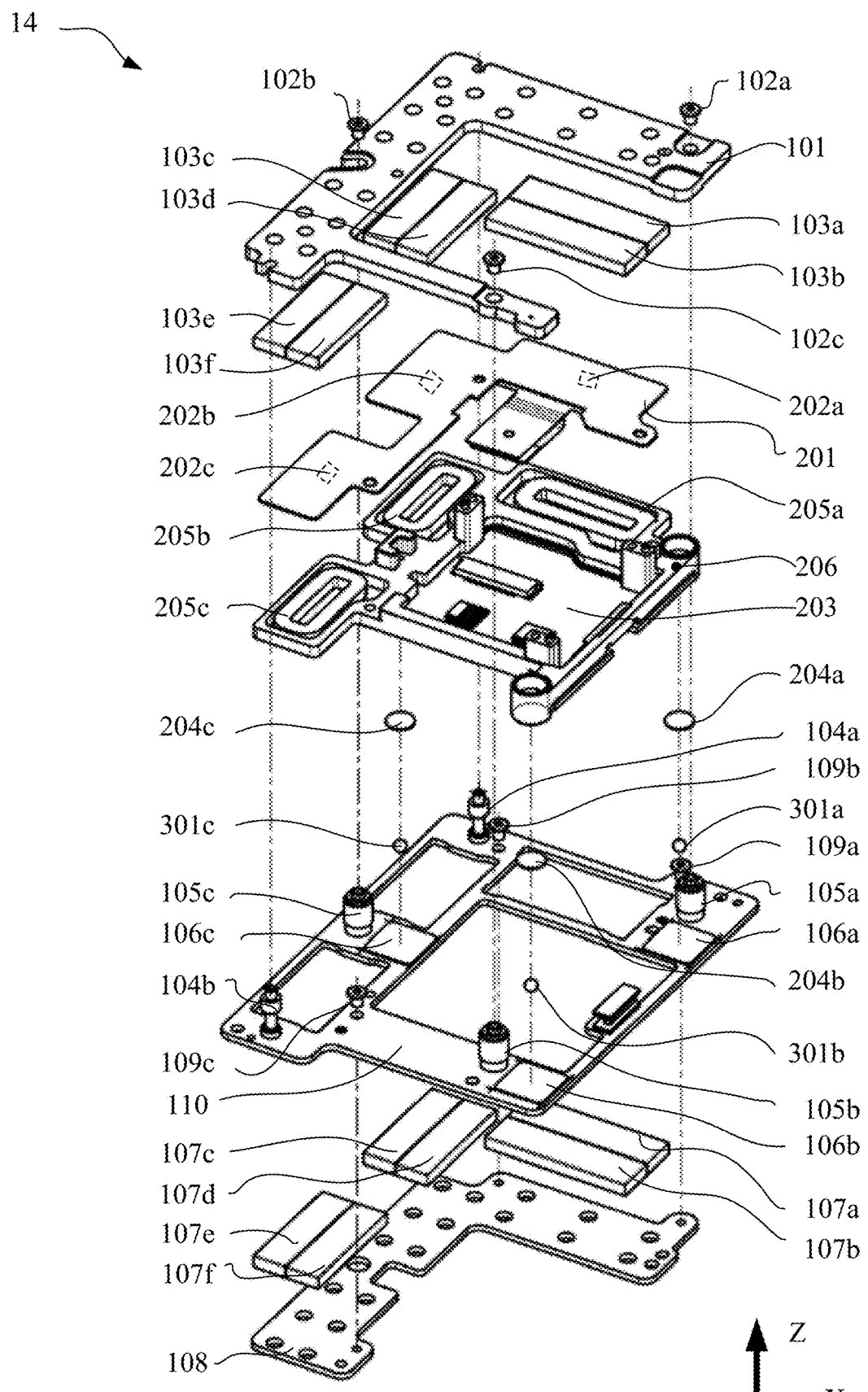
FIG. 3 is an exploded perspective view of an image stabilization unit according to an embodiment.

FIG. 3 illustrates a detailed structure of the image stabilization unit 14 in an exploded manner. In FIG. 3, a vertical direction of the figure is a direction parallel to the optical axis 4 (optical axis direction). In FIG. 3, fixed members are labelled by reference numerals 100s, and movable members are labelled by reference numerals 200s.

Reference numeral 101 denotes an upper yoke, reference numerals 102a, 102b and 102c denote screws, and reference numerals 103a, 103b, 103c, 103d, 103e and 103f denote upper magnets. Reference numerals 104a and 104b denote auxiliary spacers, reference numerals 105a, 105b, and 105c denote main spacers, and reference numerals 106a, 106b, and 106c are fixed part rolling plates. Reference numerals 107a, 107b, 107c, 107d, 107e, and 107f denote lower magnets, reference numeral 108 denotes a lower yoke, reference numerals 109a, 109b, and 109c denote screws, and reference numeral 110 denotes a base plate. Reference numeral 201 denotes an FPC, reference numerals 202a, 202b, and 202c denote position detecting elements, reference numeral 203 denotes a movable printed circuit board (PCB), reference numerals 204a, 204b and 204c denote movable part rolling plates, reference numerals 205a, 205b, and 205c denote coils, and reference numeral 206 denotes a movable frame. Reference numerals 301a, 301b, and 301c denote balls. A VCM includes the upper yoke 101, the upper magnets 103a to 103f, the lower magnets 107a to 107f, the lower yoke 108, and the coils 205a to 205c.

The upper yoke 101, the upper magnets 103a to 103f, the lower magnets 107a to 107f, and the lower yoke 108 form a closed magnetic circuit. The upper magnets 103a to 103f are adhered and fixed to the upper yoke 101 while being attracted to the upper yoke 101. The lower magnets 107a to 107f are adhered and fixed to the lower yoke 108 while being attracted to the lower yoke 108. The upper magnets 103a to 103f and the lower magnets 107a to 107f are magnetized in the optical axis direction, and adjacent magnets (for example, the magnets 103a and 103b) are magnetized in different directions. The magnets (for example, the magnets 103a and 107a) facing each other are magnetized in the same direction. This configuration increases the magnetic flux density in the optical axis direction between the upper yoke 101 and the lower yoke 108.

Since a strong attractive force is generated between the upper yoke 101 and the lower yoke 108, the main spacers 105a to 105c and the auxiliary spacers 104a and 104b disposed between them can properly maintain the distance between the upper yoke 101 and the lower yoke 108. The proper distance is a distance at which the coils 205a to 205c and the FPC 201 can be disposed with a predetermined gap between the upper magnets 103a to 103f and the lower magnets 107a to 107f. Screw holes are provided in the main spacers 105a to 105c, and the upper yoke 101 is fixed onto the main spacers 105a to 105c by the screws 102a to 102c inserted them. Rubber is provided on the outer circumference of the body of the main spacers 105a to 105c, and forms a stopper that serves as a mechanical end of the movable part.

An opening is formed in the base plate 110, and the lower magnets 107a to 107f are disposed so that the magnet surface projects from this opening. More specifically, the lower yoke 108 is fixed onto the base plate 110 by the screws 109a to 109c and at this time, the lower magnets 107a to 107f thicker than the base plate 110 project from the opening of the base plate 110.

The movable frame 206 is a member molded by magnesium die casting or aluminum die casting, and is lightweight and highly rigid. Other members forming the movable part are fixed onto the movable frame 206. Position detection elements 202a, 202b, and 202c indicated by broken lines are mounted on the backside of the FPC 201 at three locations. The position detecting element uses a hall element or the like that can detect the position of the movable part by using the above closed magnetic circuit. The position detecting elements 202a, 202b, and 202c are disposed inside the windings of the coils 205a, 205b, and 205c, respectively.

The movable PCB 203 fixed onto the movable frame 206 is connected to the image sensor 6, the coils 205a to 205c, and the position detection elements 202a to 202c on the back surface, which electrically communicate with the camera controller 5 and the like via a connector on the movable PCB 203.

The fixed part rolling plates 106a to 106c are adhesively fixed onto the base plate 110, and the movable part rolling plates 204a to 204c are adhesively fixed onto the movable frame 206. The fixed part rolling plates 106a to 106c and the movable part rolling plates 204a to 204c are sandwiched between the movable part and the fixed part to form the rolling surface of the balls 301a to 301c which guides the movable part relative to the fixed part in a plane orthogonal to the optical axis 4.

In the image stabilization unit configured as described above, when the coils 205a to 205c are energized, a force is generated according to the Fleming's left-hand rule, and the coils 205a to 205c shift and rotate the movable part relative to the fixed part in the plane orthogonal to the optical axis 4. At this time, the shift and rotation of the movable part can be feedback-controlled by using the position of the movable part detected by the position detection elements 202a to 202c.

Figure 4A:
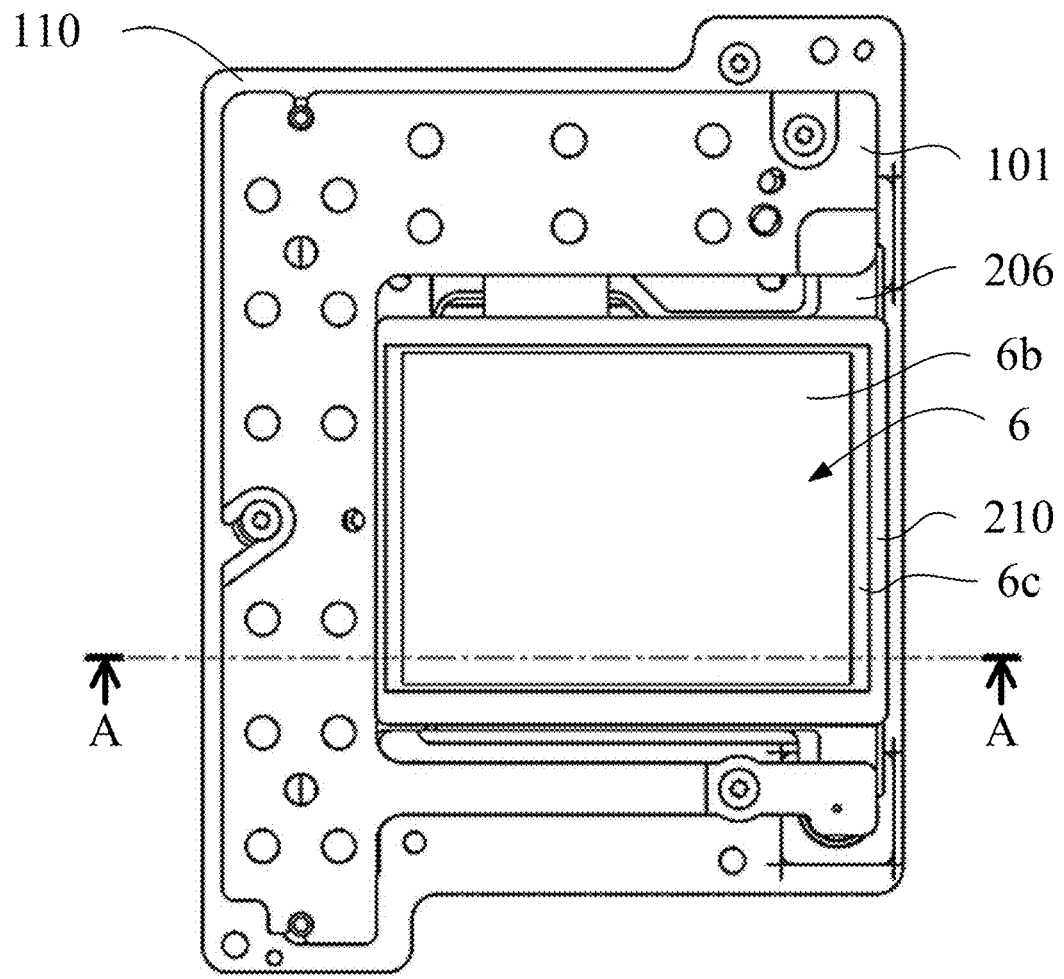
FIGS. 4A and 4B explain a magnetic flux generation in the image stabilization unit and the influence on the image sensor.
Figure 4B:
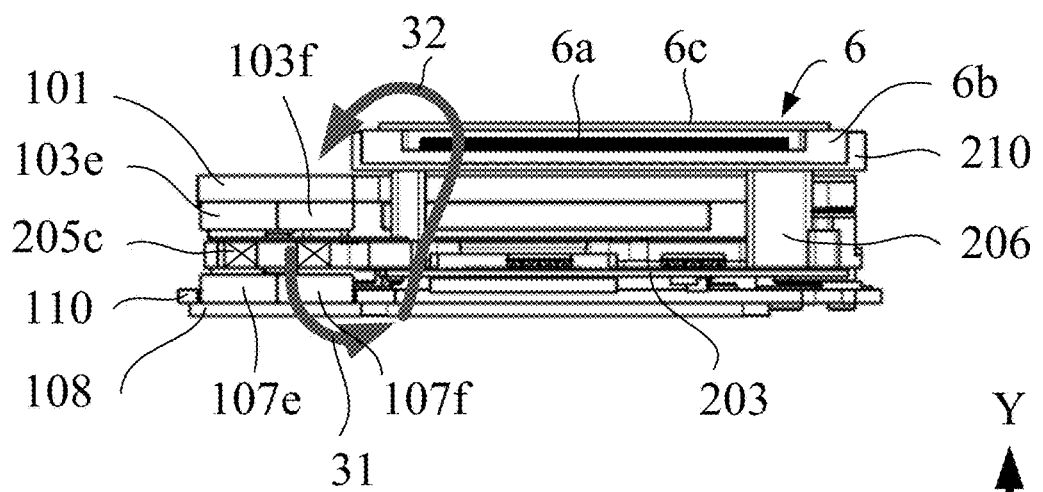

Referring now to FIGS. 4A to 4C, a description will be given of the leakage magnetic flux from the VCM. FIGS. 4A to 4C illustrate the image stabilization unit 14 to which the image sensor 6 is attached. FIG. 4A illustrates the image stabilization unit 14 viewed from the optical axis direction, and FIG. 4B illustrates a section taken along the line A-A in FIG. 4A. The image sensor 6 includes a CMOS sensor 6a and a sensor housing 6c that holds the CMOS sensor 6a. A light receiving surface (imaging surface) of the CMOS sensor 6a is covered with a cover glass 6b. The image sensor 6 is held by the sensor holder 210 fixed onto the movable frame 206 illustrated in FIG. 3. Therefore, when the movable frame 206 shifts and rotates, the image sensor 6 shifts and rotates.

When a current flows through the coil 205c illustrated in FIG. 4B, a magnetic flux is generated in the VCM. At this time, most of the magnetic fluxes are blocked by the upper yoke 101 and the lower yoke 108 formed of a soft magnetic material, but part of the magnetic fluxes (leakage magnetic flux) follows the paths indicated by arrows 31 and 32 and reaches the CMOS sensor 6a. Although FIG. 4B illustrates only the coil 205c, the leakage magnetic flux reaches the CMOS sensor 6a in the same manner when a current flows through the other coils 205a and 205b. If the leakage magnetic flux is generated when the signal is read out of the CMOS sensor 6a, striped noises may appear on the image.

Since this embodiment performs the energization control over the coils 205a to 205c by the pulse width modulation (PWM) method, the direction and amount of the current flowing in each coil fluctuate at a constant cycle. Thereby, a so-called ripple current is generated and the unnecessary magnetic flux is generated. When the unnecessary magnetic flux becomes a leakage magnetic flux and reaches the CMOS sensor 6a, it causes the above noises.

Figure 5A:
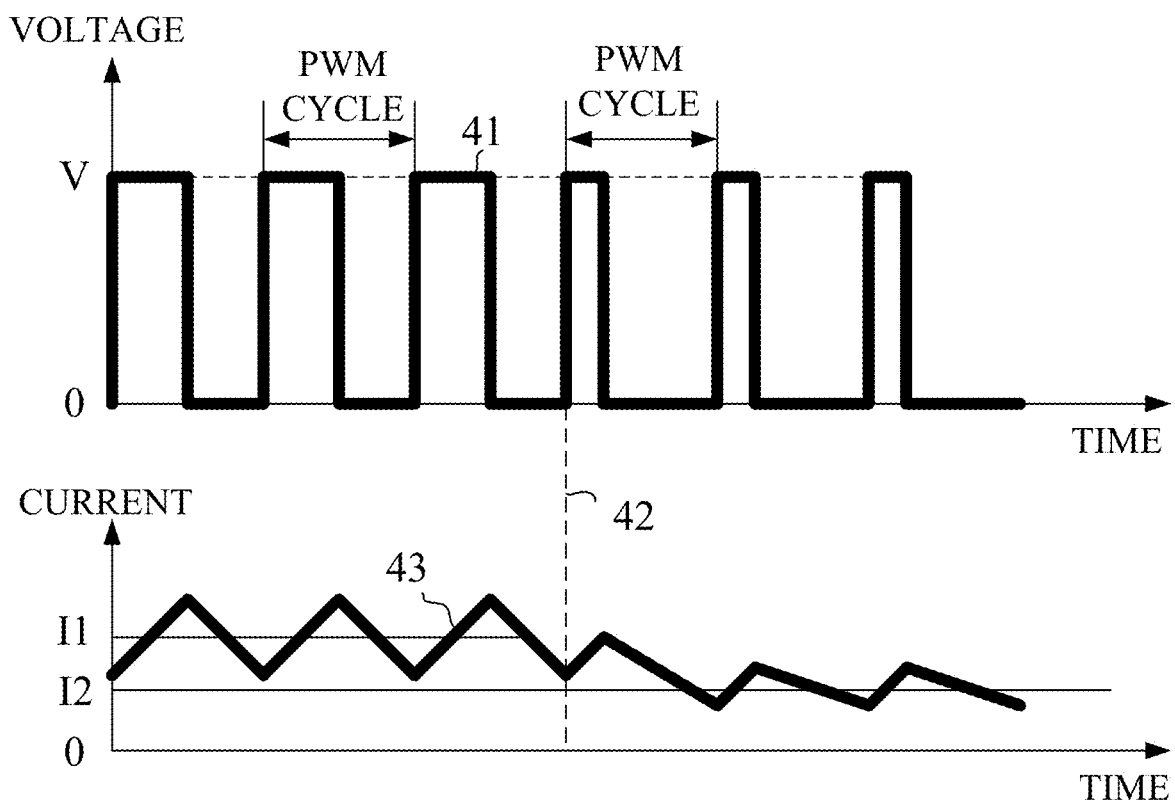
FIGS. 5A and 5B explain a relationship between an energization control in a PWM method in the image stabilization unit and stripe noises in an image.

A description will now be given of a relationship between the ripple current generated by the coil energization in the PWM system and the striped noises generated in the image. FIG. 5A illustrates a relationship between the voltage and current in the coil energization in the PWM system. Reference numeral 41 denotes a voltage waveform, reference numeral 42 denotes a timing for switching the PWM DUTY, and reference numeral 43 denotes a current waveform.

In the PWM method, the driving force of the VCM is digitally controlled so as to change the DUTY of coil energization within a fixed cycle (PWM cycle). In an example, the coil energization is performed at +50% DUTY before the timing 42 in FIG. 5A, and coil energization is performed at +25% DUTY after the timing 42. In this example, the voltage applied to the coil is alternated between two values of +V and 0.

The PWM cycle is set to a cycle corresponding to a frequency sufficiently higher than the frequency at which the mechanical response of the image stabilization unit is expected. For example, when the image stabilization is performed up to about 100 Hz, the PWM frequency is set to 100 kHz or the like. Thereby, the fluctuation of the control in the PWM method is insignificant in the actual control, and only the average response is output. In the image stabilization unit described with reference to FIG. 3, the high frequency component is sufficiently cut off due to the effect of the mass of the movable frame 206. Therefore, the fluctuation at the PWM frequency changes the driving force, but is not observed as the movement of the movable frame 206.

On the other hand, the current flowing through the coil fluctuates so as to form a triangular wave at the PWM frequency, as shown by the current waveform 43. At this time, DUTY may be set as follows when an average current I1 is applied to the coil, where R is a resistance of the coil:

$$I1 = V \times DUTY/R$$

In FIG. 5A, since the DUTY is +50% before the timing 42, a coil current of I1=V/(2R) flows. Since the DUTY is +25% after the timing 42, a coil current of I1=V/(4R) flows. The average current such as the currents I1 and I2 generates a driving force in the VCM. That is, the driving force of the VCM can be controlled by changing DUTY.

The current waveform 43 changes depending on the impedance (resistance value and inductance) of the coil. When the PWM frequency is higher than the cutoff frequency determined by the impedance of the coil, the triangular current waveform 43 is obtained as illustrated in FIG. 5A. The amplitude of the triangular wave is determined by the impedance of the coil. This triangular wave current is called a ripple current. Since the ripple current is not a sine wave but a triangular wave, it contains a harmonic component as well as many PWM frequency components. When a current flows through the coil, a corresponding magnetic flux is generated. Thus, the magnetic flux is also generated by the ripple current. As a result, a magnetic flux that changes at the PWM frequency is generated.

Figure 5B:
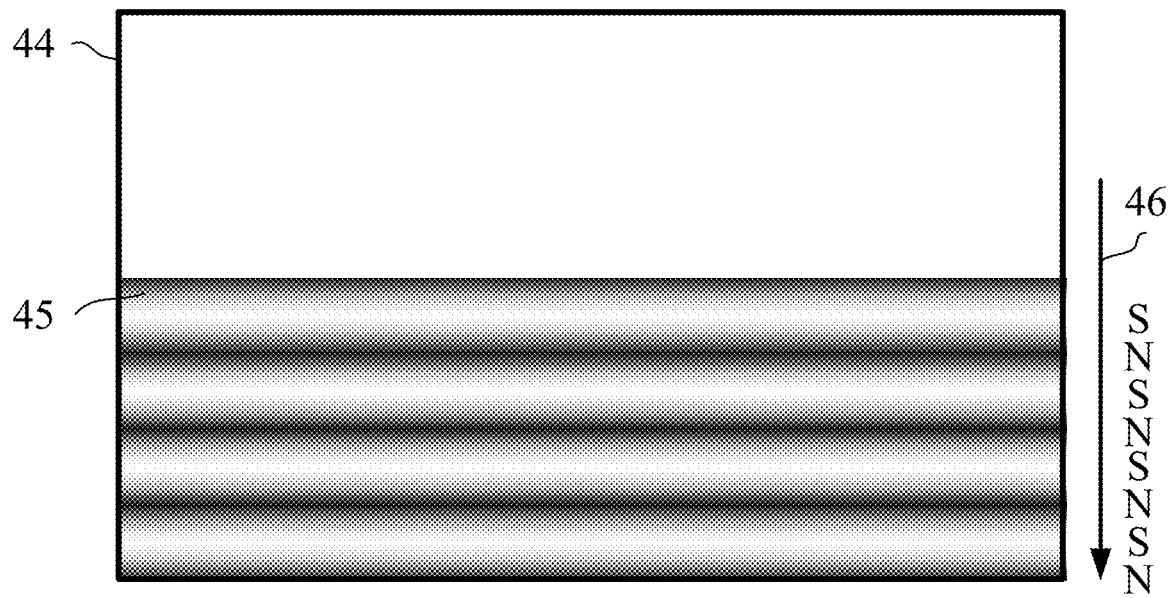

Then, when the magnetic flux changes due to the ripple current, striped noises 45 are generated in the image 44 as illustrated in FIG. 5B. A signal is sequentially read out of the image sensor 6 (CMOS sensor 6a) in the direction indicated by an arrow 46. The read cycle at this time is not completely synchronized with the PWM cycle for controlling the image stabilization unit 14. Hence, FIG. 5B schematically illustrates changes of the magnetic flux generated by the ripple current generated for each read cycle as alternations N, S, N, and S. When the magnetic flux acts on an electric circuit such as an amplifier in reading a signal, the read potential changes. In particular, when the image sensor 6 has a high sensitivity (high ISO speed), the change in the read potential becomes large. As a result, periodic brightness changes occurs in the image in the vertical direction, and are observed as the stripe noises 45.

In FIG. 5B, the image is dark when the magnetic flux is N, and the image is bright when the magnetic flux is S, but this depends on the configuration of the electric circuit.

Figure 6A:
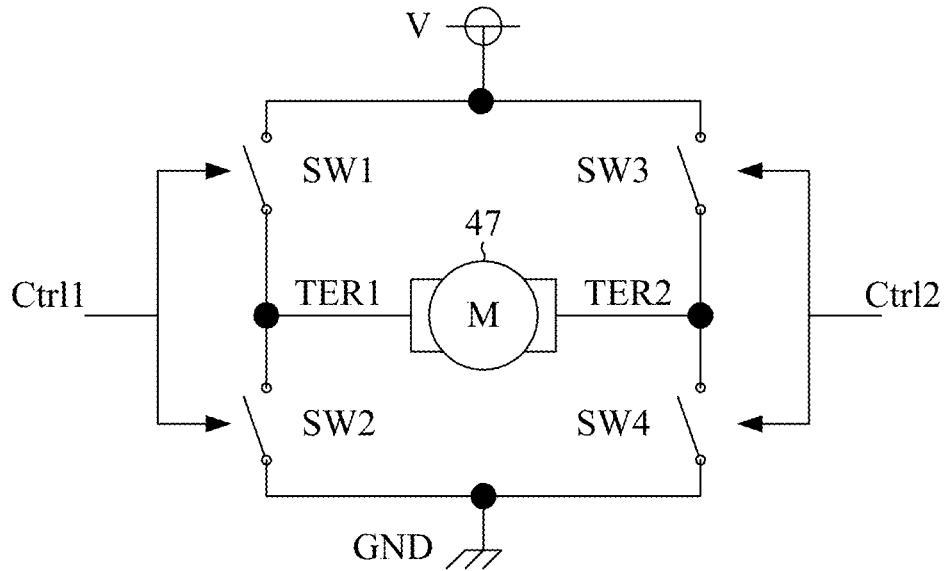
FIGS. 6A to 6C illustrate a driving circuit for the image stabilization unit.
Figure 6B:
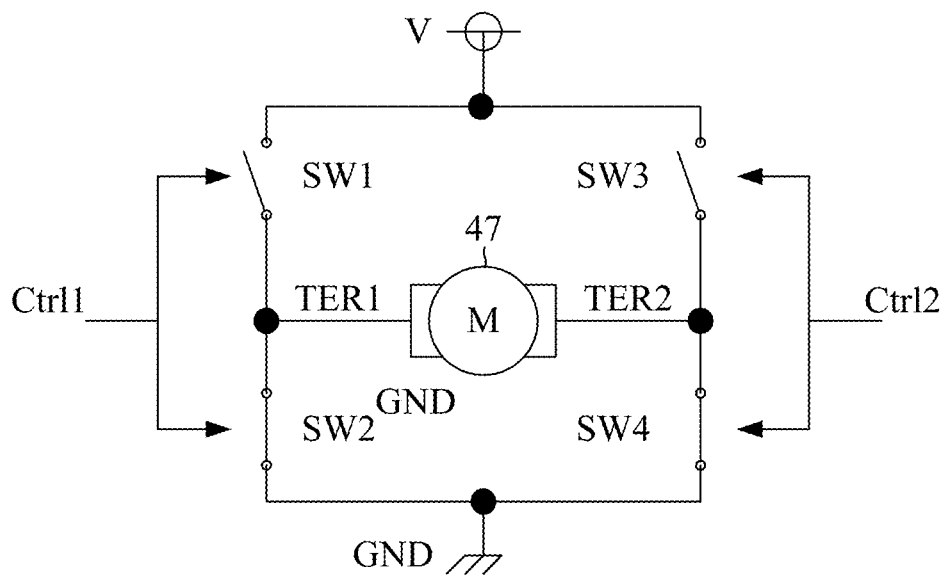
Figure 6C:
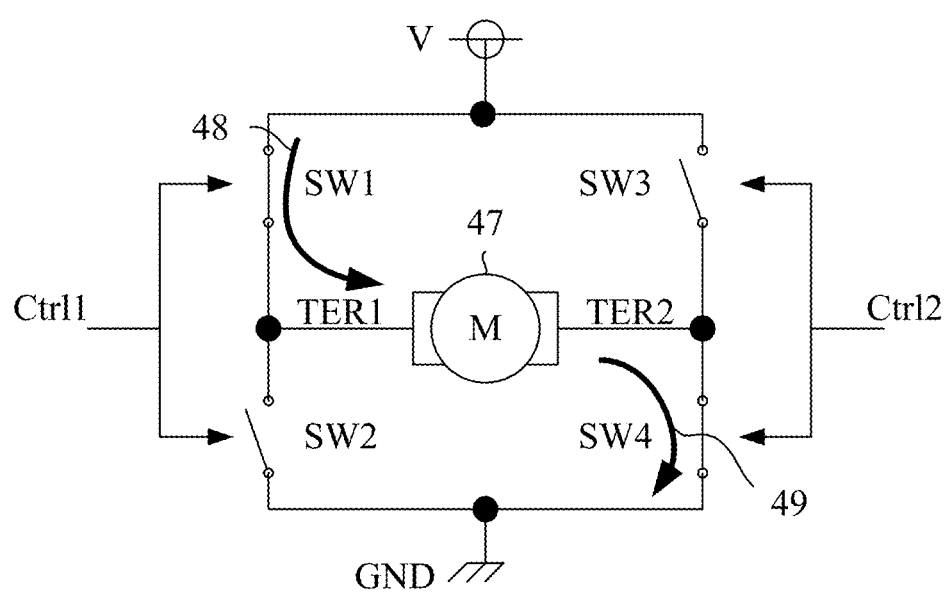

FIGS. 6A to 6C show an illustrative electric circuit for controlling energizing the coil by the PWM method. This electric circuit is a circuit generally called an H bridge. Reference numeral 47 denotes a motor, which corresponds to a coil in the image stabilization unit 14. FIG. 6A illustrates a state where the switch of the H bridge is opened to a high impedance state, FIG. 6B illustrates a state where it is short-circuited to the ground, and FIG. 6C illustrates a state in which currents 48 and 49 flow in a direction from TER1 to TER2.

The H bridge has four switches SW1, SW2, SW3, and SW4, and the motor 47 is disposed at the center to form the H-shaped circuit. The set of switches SW1 and SW2 is controlled by a single control signal Ctrl1, and the other set of switches SW3 and SW4 is controlled by another single control signal Ctrl2. The two switches in each set are controlled so that only one of them is turned on. That is, SW1 and SW2 are not turned on at the same time, and SW3 and SW4 are not turned on at the same time. This is because when the two switches in each set are turned on at the same time, the voltage V and the GND are short-circuited, a large current flows, and the circuit gets damaged. Therefore, when a state where SW1 is turned on and SW2 is turned off is changed to a state where SW1 is turned off and SW2 is turned on, a control is made to turn off both SW1 and SW2 for a predetermined time. This predetermined time is referred to as a dead time, which is a responseless time in the control. The problems associated with this dead time will be described later.

When the motor 47 is not energized, the switches SW1 to SW4 are controlled as illustrated in FIG. 6A or 6B. In FIG.

6B, since TER1 and TER2 are in a short-circuited state, the brake is applied to the motor 47 when the counter electromotive force is generated from the motor 47 (in a case of the rotary motor, the motor is rotating due to the inertia load).

On the other hand, in energizing the motor 47, by turning on SW1 and SW4 as illustrated in FIG. 6C, the currents 48 and 49 flow in the direction from TER1 to TER2. In order to apply the current in the opposite direction, SW2 and SW3 may be turned on.

As understood from FIGS. 6A to 6C, three types of voltages, such as +V, 0, and −V to be applied to both ends of the motor 47 can be instructed. Controlling Ctrl1 and Ctrl2 so as to correspond to the PWM type energization control can easily perform the PWM type energization control using the H bridge.

Figure 7A:
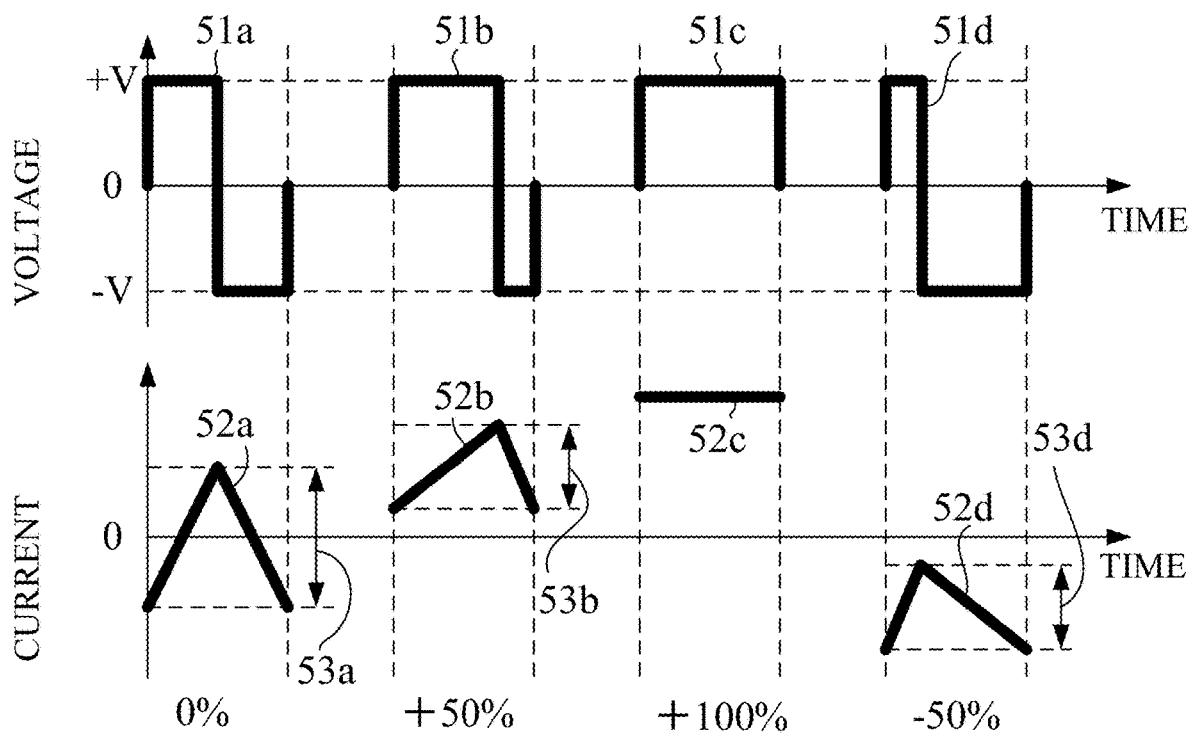
FIGS. 7A and 7B explain states of the voltage and current in a plurality of energization methods.
Figure 7B:
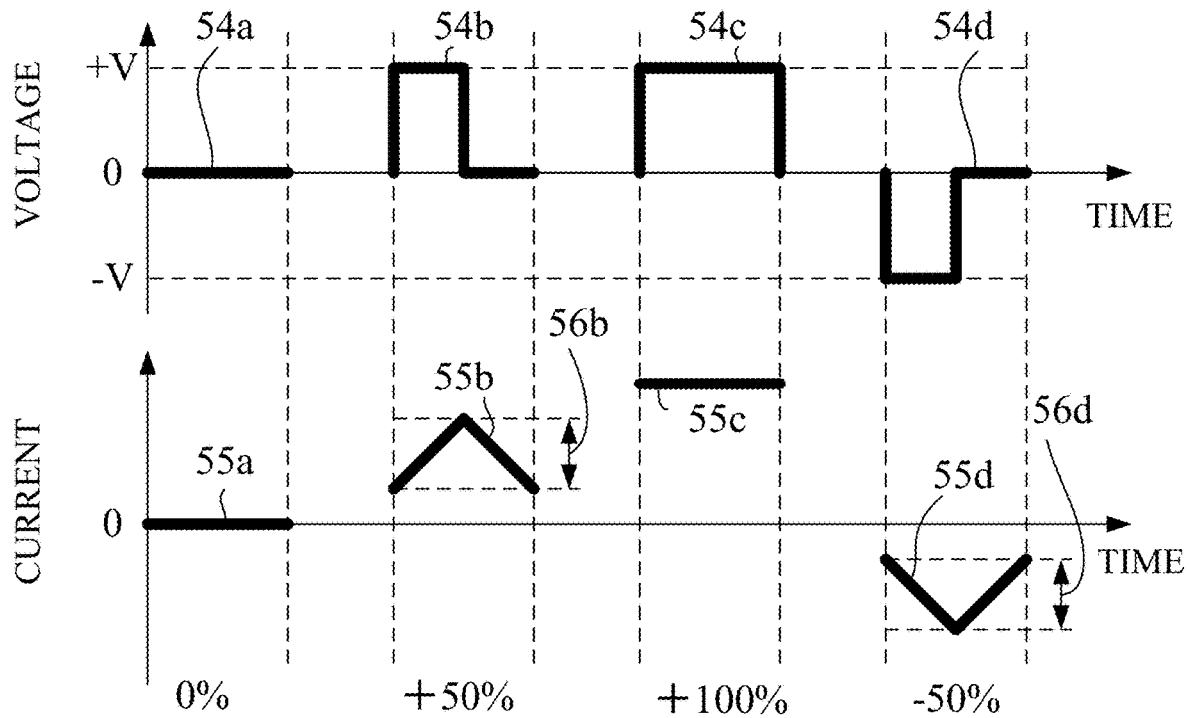

FIGS. 7A and 7B show two illustrative energization methods in the PWM method and ripple currents generated in those energization methods. FIG. 7A illustrates a forward and reverse energization method (first energization method) using only two voltages +V and −V, and FIG. 7B illustrates an on-short energization method (second energization method) using three voltages +V, 0, and −V. Both 7A and 7B illustrate the steady-state voltage and current for one PWM cycle when currents of 0%, +50%, +100%, and −50% are made to flow from the left side to the fully energized state (the state where the DC-like voltage V is applied). "Steady" means a stable state rather than a transient response. The ripple current is actually a small current value, but this is exaggerated in the current graph in FIGS. 7A and 7B.

In FIG. 7A, reference numerals 51a, 51b, 51c, and 51d denote voltage waveforms in which DC-like currents are 0%, +50%, +100%, and −50% in the forward and reverse energization method, respectively, and reference numerals 52a, 52b, 52c, and 52d denote the current waveforms in which the DC-like currents are 0%, +50%, +100%, and −50% in the forward and reverse energization method, respectively. Reference numerals 53a, 53b, and 53d denote the magnitudes of ripple currents generated when the DC-like currents become 0%, +50%, and −50% in the forward and reverse energization method, respectively.

Similarly, in FIG. 7B, reference numerals 54a, 54b, 54c, and 54d denote voltage waveforms in which the DC-like currents are 0%, +50%, +100%, and −50% in the on-short energization method, and reference numerals 55a, 55b, 55c, and 55d respectively denote current waveforms in which the DC-like currents are 0%, +50%, +100%, −50% in the on-short energization method. Reference numerals 56b and 56d respectively denote the magnitudes (amplitudes) of the ripple currents generated when the DC-like currents are +50% and −50% in the on-short energization method.

As illustrated in FIG. 7A, when no DC-like current is applied in the forward and reverse energization method, +V and −V voltages are applied at a ratio of 50% as shown by the voltage waveform 51a. Thereby, as illustrated by the current waveform 52a, no current flows on average and fluctuates around 0, and a triangular wave-shaped ripple current (magnitude 53a) is generated. Since +V and −V are applied, the ripple current becomes maximum. In other words, the ripple current is larger than that in any other state, and the stripe noise amount generated in the image is also larger. In order to make the DC-like current +50% in the forward and reverse energization method, +V is applied for 75% of the PWM cycle and −V is applied for 25% of the PWM cycle as illustrated by the voltage waveform 51b.

When the DC current is increased in the + direction from this position, the +V ratio increases and the voltage waveform changes as indicated by 51c. When the DC-like current is increased in the − direction, the −V ratio increases, and the voltage waveform changes at −50% current as indicated by 51d. The ripple current decreases as the DC current becomes 0%, +50%, +100%, and −50%, and when the current is +50% and −50%, the ripple current has magnitudes indicated by 53b and 53d. When the DC-like current is +100%, the voltage is constant at +V, so there is no fluctuations in the voltage and current in the PWM cycle, and no ripple current occurs. Although not shown, when the DC-like current is −100%, the voltage is constant at −V, so that the voltage and the current do not fluctuate in the PWM cycle, and no ripple current occurs.

As illustrated in FIG. 7B, when no DC-like current is applied in the on-short energization method, a so-called short state is formed as indicated by the voltage waveform 54a. That is, the voltage does not change from 0V. Thereby, no current flows on average as illustrated by the current waveform 55a. Since the voltage is constant at 0, there is no fluctuations in voltage and current in the PWM cycle, and no ripple current occurs. In the on-short energization method, the ratio of +V increases as the DC-like current increases in the + direction. In order to make the DC-like current +50%, +V is applied during 50% of the PWM cycle and 0 is applied during 50%. As the current is increased in the + direction, the +V ratio further increases, and the voltage waveform changes from 54b to 54c. As the current is increased in the − direction, the −V ratio increases, and when the DC-like current is −50%, the voltage waveform changes as indicated by 54d.

In the on-short energization method, the ripple current becomes maximum (56b, 56d) when the DC-like current is ±50%. When the DC-like current is +100%, the voltage is constant at +V, so that there is no fluctuations in the voltage and current in the PWM cycle, and no ripple current occurs. Although not illustrated, when the DC-like current is −100%, the voltage is constant at −V, so that the voltage and the current do not fluctuate in the PWM cycle, and no ripple current occurs.

The magnitude of the ripple current in the forward and reverse energization method is always larger than the ripple current generated in the on-short energization method, regardless of the magnitude of the DC-like current. Assume that the DC-like current is +50% as an example. Then, the magnitude 53b of the ripple current illustrated in FIG. 7A is larger than the magnitude 56b of the ripple current illustrated in FIG. 7B. The difference between them increases as the magnitude of the DC-like current decreases. When the DC-like current is 0%, the ripple current changes between the magnitudes 53a and 0, and the difference between them is significantly large. Although the noises increase when the forward and reverse energization method is used, the noises can be suppressed to a low level when the on-short energization method is used.

On the other hand, the image stabilization unit 14 according to this embodiment needs to reduce the power consumption for holding the movable part against its own weight while securing the power for driving the movable part. The image stabilization unit 14 needs to be designed so that the power consumption or the DC-like current is maintained small where the weight of the movable part is held, which is the longest in that state.

Figure 8A:
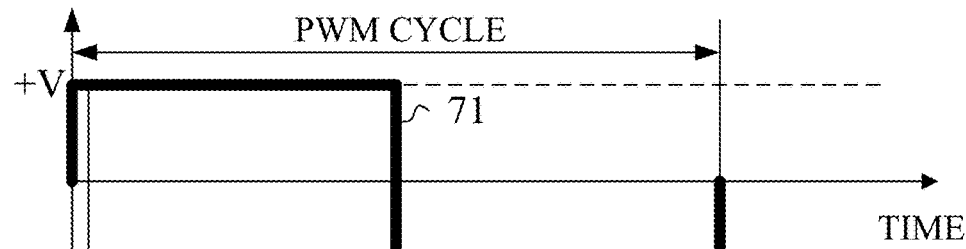
FIGS. 8A to 8E illustrate an illustrative waveform and distortions in the forward and reverse energization method.
Figure 8B:
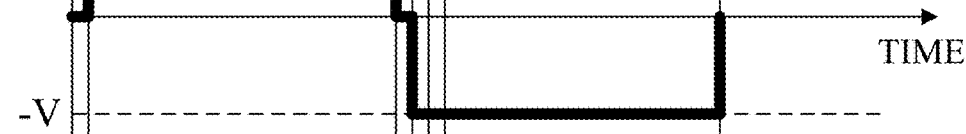
Figure 8C:
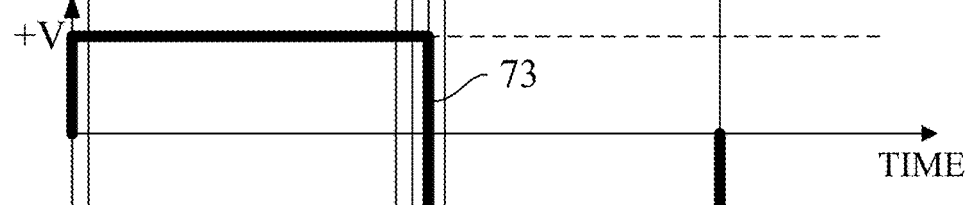
Figure 8D:
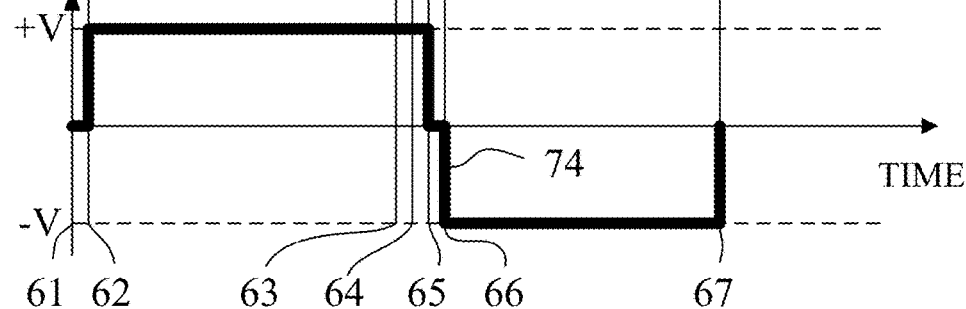

Referring now to FIGS. 8A to 8E and 9A to 9E, a description will be given of the distortions of the VCM response in the forward and reverse energization method and the on-short energization method. In the forward and reverse energization method, FIG. 8A illustrates a command voltage 71 for instructing the energization when the magnitude of the DC current flowing through the actuator (coil) is set to 0, and FIG. 8B illustrates the both-end voltage 72 in the actuator (coil) when the command voltage 71 in FIG. 8A is received. FIG. 8C illustrates the command voltage 73 that makes the magnitude of the DC-like current a little +, and FIG. 8D illustrates the both-end voltage 74 in the actuator when the command voltage 73 in FIG. 8C is received.

In FIGS. 8A to 8D, reference numeral 61 denotes a start timing of the PWM cycle, reference numeral 62 denotes a timing delayed by the dead time from the start timing 61, and reference numeral 63 denotes a middle of the PWM cycle. Reference numeral 64 denotes a timing delayed by the dead time from the timing 63, and reference numeral 65 denotes a voltage switching timing after the +V time is made longer to flow a DC-like current. Reference numeral 66 denotes a timing delayed by dead time from the timing 65, and reference numeral 67 denotes an end timing of the PWM cycle. FIGS. 8A to 8D show the waveforms of the command voltage and the both-end voltage in a single PWM cycle, and this waveform is actually formed every PWM cycle.

The command voltage 71 illustrated in FIG. 8A is a command to apply +V during 50% of the PWM period and apply −V during the remaining 50% of the PWM period, similar to the voltage waveform 51a illustrated in FIG. 7A. Therefore, +V is instructed from the timing 61 to the timing 63, and −V is instructed from the timing 63 to the timing 67. The both-end voltage in the actuator at this time will now be described. As described with reference to FIGS. 6A to 6C, in a circuit that performs the energization control by the PWM method, a switch OFF period or the dead time is generally provided to prevent the short-circuit state. FIG. 8B schematically illustrates the both-end voltage 72 in the actuator in consideration of the dead time. Although +V is instructed at the timing 61, the leading of the both-end voltage in the actuator delays due to the dead time, and the voltage becomes +V at the timing 62. Similarly, when the instruction to change the voltage from +V to −V is made at the timing 63, the switching of the both-end voltage in the actuator delays due to the dead time and the both-end voltage becomes −V at the timing 64.

On the other hand, in order to make the magnitude of the DC-like current a little +, the +V period should be set slightly longer than the −V period. Therefore, as shown by the command voltage 73 in FIG. 8C, +V is instructed from the timing 61 to the timing 65, and −V is instructed from the timing 65 to the timing 67. The both-end voltage in the actuator becomes +V at the timing 62 due to the dead time, becomes 0 to prevent short-circuiting between the timing 65 and the timing 66, and becomes −V from the timing 66 to the timing 67.

Figure 8E:
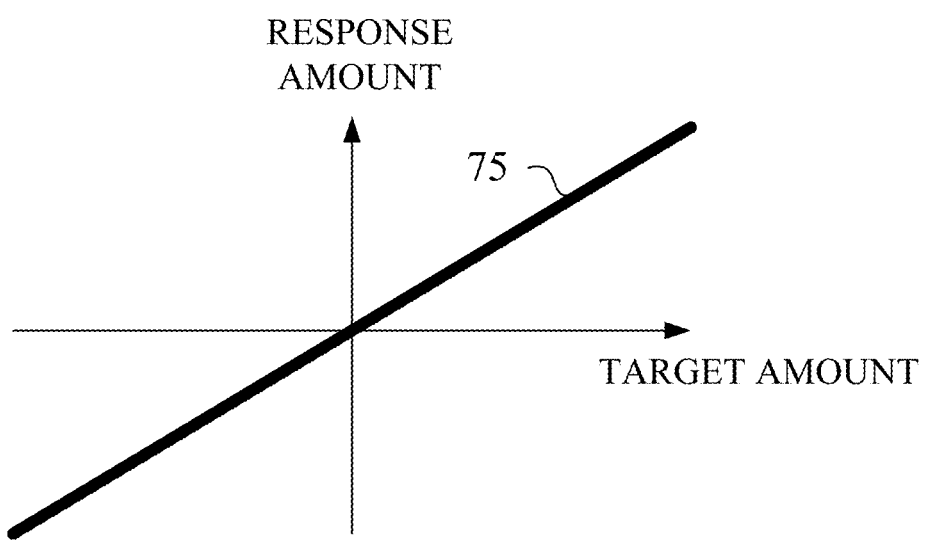

Referring now to FIG. 8E, a description will be given of the target amount of the DC-like current and the response amount obtained as the both-end voltage in the actuator in the forward and reverse energization method. FIG. 8E illustrates a response amount 75 obtained by the forward and reverse energization method for the target amount of DC-like current. The abscissa axis represents the target amount and the ordinate axis represents the response amount.

In the forward and reverse energization method, there is a period that becomes OFF (=0) due to voltage switching, but this reduces both +V and −V periods, so the response distortion is small. The term "response distortion (or response amount distortion)," as used herein, means that the response amount differs from the target amount. This is graphed as illustrated in FIG. 8E, and the response amount 75 with a small distortion, such as a straight line passing through the origin, is obtained.

On the other hand, in the on-short energization method, FIG. 9A illustrates a command voltage 91 when the magnitude of the DC-like current flowing through the actuator (coil) is set to 0, and FIG. 9B illustrates a both-end voltage 92 in the actuator when the command voltage 91 in FIG. 9A is received. FIG. 9C illustrates a command voltage 93 that makes the magnitude of the DC-like current slightly +, and FIG. 9D illustrates a both-end voltage 94 in the actuator when the command voltage 93 in FIG. 9C is received.

In FIGS. 9A to 9D, reference numeral 81 denotes a start timing of the PWM cycle, and reference numeral 82 denotes a timing delayed by the dead time from the start timing 61. Reference numeral 83 denotes a voltage switching timing after the +V period is made longer to flow a DC-like current. Reference numeral 84 denotes a timing delayed by the dead time from the timing 83, and reference numeral 85 denotes an end timing of the PWM cycle. FIGS. 9A to 9D show the waveforms of the command voltage and the both-end voltage in a single PWM cycle, and this waveform is actually formed every PWM cycle.

The command voltage 91 illustrated in FIG. 9A always indicates a voltage of 0, similar to the voltage waveform 54a illustrated in FIG. 7B. The both-end voltage 92 in the actuator at this time is also always 0.

On the other hand, in order to make the magnitude of the DC-like current a little +, the +V period may be set to a predetermined time period. Therefore, as in the command voltage 93 illustrated in FIG. 9C, +V is instructed from the timing 81 to the timing 83, and 0 is instructed from the timing 83 to the timing 85. Due to the dead time, the both-end voltage in the actuator becomes +V at the timing 82 and becomes 0 at the timing 83. From the timing 84, 0 is instructed regardless of preventing short-circuiting due to the dead time.

In the on-short energization method, the target voltage values are +V and 0, so the +V period and the 0 period nonlinearly change. For example, when +V is instructed for an extremely short time period, such as a period shorter than the dead time, the both-end voltage in the actuator does not become +V but remains 0.

Figure 9E:
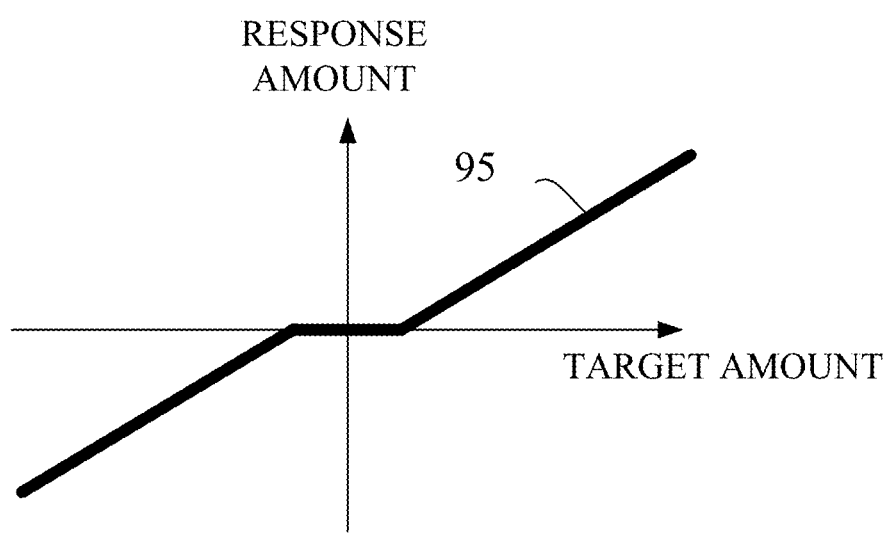

Referring now to FIG. 9E, a description will be given of a target amount of the DC-like current and a response amount obtained as the both-end voltage in the actuator in the on-short energization method. FIG. 9E illustrates a response amount 95 obtained by the forward and reverse energization method for the target amount of the DC-like current. The abscissa axis represents the target amount and the ordinate axis represents the response amount. Since the on-short energization method has the above characteristics, the response amount 95 with a large distortion including the dead zone near the origin can be obtained.

The controllability is different between the forward and reverse energization method described in FIG. 8E and the on-short energization method described in FIG. 9E because the response amounts 75 and 95 have different distortions. The forward and reverse energization method in which the response amount has a small distortion amount is superior to the on-short energization method in controllability.

As described with reference to FIGS. 7A to 9E, there are differences in response amount distortion and ripple current depending on the energization method. The forward and reverse energization method is an energization method in which the response has a smaller distortion amount and the ripple current is larger than those in the on-short energization method. On the contrary, the on-short energization method is an energization method in which the response has a larger distortion amount and the ripple current is smaller than those in the forward and reverse energization method. However, the forward and reverse energization method and the on-short energization method are merely illustrative, and the present invention is not limited to these energization methods as long as there is a difference in response distortion or magnitude of ripple current.

Figure 1:
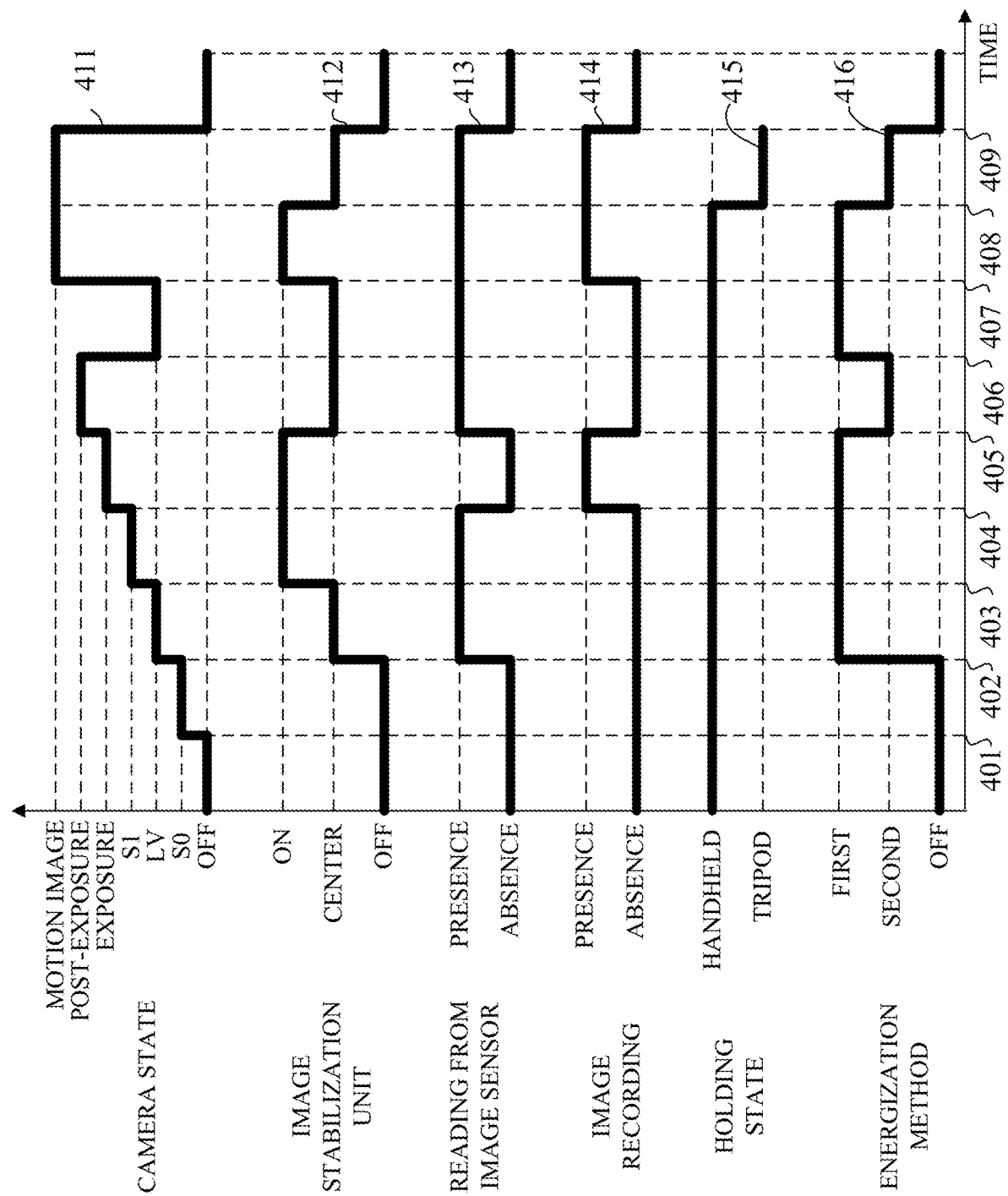
FIG. 1 illustrates an operation sequence of an image pickup apparatus according to one embodiment of the present invention.

FIG. 1 illustrates an operation sequence of the camera according to this embodiment. Each operation in this operation sequence is controlled by the camera controller 5. The abscissa axis in FIG. 1 indicates the flow of time, and the intervals among the timings 401 to 409 in FIG. 1 are uniform, but the actual intervals are not uniform.

FIG. 1 illustrates, in order from the top, a state 411 of the camera 1, a state 412 of the image stabilization unit 14, a read state 412 from the image sensor 6, an image recording state 414, a holding state 415 of the camera 1 and an energization method 416. The state 411 of the camera 1 includes an (OFF) state in which the camera 1 is powered off, a (S0) state in which the power is turned on, a (LV) state in which a live-view image is displayed, and a (S1) state in which a signal is input in the still image capturing mode, an (exposure) state in which the image sensor 6 is exposed, a (post-exposure) state in which a signal is read out of the image sensor 6 after the exposure, and a (motion image) state in which a motion image is captured in a motion image capturing mode. The state 412 of the image stabilization unit 14 includes an (OFF) state in which the VCM is not energized and the image stabilization operation is not performed, a self-weight holding state (center) in which the image stabilization operation is not performed but the VCM is energized to support the own weight of the movable part, and an (ON) state in which the VCM is energized to perform the image stabilization operation.

The read state 412 from the image sensor 6 has two states: a state in which the signal is read out of the image sensor 6 and a state in which the signal is not read out of the image sensor 6. The image recording state 414 includes a state in which the image is recorded in the memory 8 and a state in which the image is not recorded. The holding state of the camera 1 includes a (handheld) state in which the user holds the camera 1 and a (tripod) state in which the camera 1 is fixed by a support member such as a tripod. There are three energization methods: an (OFF) state in which the actuator is not energized, a (first) state in which the first energization method is used and a (second) state in which the second energization method is used.

In FIG. 1, when the power is turned on at the timing 401, the state of the camera 1 becomes "S0". Now assume that the still image capturing mode is set.

Next, at the timing 402, the state of the camera 1 shifts to "LV" (third state), and the live-view image display starts. Then, the image stabilization unit 14 is in the self-weight holding state ("center"), and the image sensor 6 continuously performs charge accumulations and signal reading. The live-view image acquired herein is not recorded in the memory 8. In "LV", the signal is read out while the image sensor 6 is accumulating charges, but the image is not recorded and thus the energization to the image stabilization unit 14 is controlled by the forward and reverse energization method as the first energization method so as to improve the controllability of the image stabilization unit 14 and to obtain the high image stabilizing performance, rather than suppressing the noises generated in the image.

Next, at the timing 403, the state of the camera 1 shifts to "S1" in response to the half-pressing operation of the shutter button, and the user sets the image composition. Then, the image stabilization unit 14 starts the image stabilization operation ("ON"), and the image sensor 6 continuously performs charge accumulations and signal reading. Even in "S1", similar to "LV", since the image is not recorded in the memory 8, the first energization method is used to control energizing the image stabilization unit 14 in order to obtain the high image stabilizing performance.

Next, at the timing 404, the state of the camera 1 shifts to "exposure" (first state) in response to the full-pressing operation of the shutter button, and the image sensor 6 is exposed. Then, the image stabilization unit 14 continues to perform the image stabilizing operation ("ON"). The image sensor 6 accumulates charges during the "exposure" from the timing 404 to the timing 405, but does not read out signals. Therefore, even during the "exposure", the energization to the image stabilization unit 14 is controlled by the first energization method. This is because, the noises is less influential during "exposure" and thus the high image stabilizing performance is prioritized.

Next, when the exposure is completed at the timing 405, the state of the camera 1 shifts to the "post-exposure" (second state), and the signal is read out of the image sensor 6 after the charges are accumulated. In the "post-exposure", the signal is read out of the image sensor 6, but the image stabilization unit 14 does not need to perform the image stabilization operation. However, the self-weight of the movable part of the image stabilization unit 14 is held ("center"). Therefore, in the "post-exposure", the energization to the image stabilization unit 14 is controlled by the on-short energization method as the second energization method. This is because in the "post-exposure", it is necessary to suppress the influence of noises on the image in order to read the signal out of the image sensor 6, but the image stabilization operation is unnecessary, the weight of the movable part must be held, and thus the noise reduction is prioritized to the image stabilization. Thereby, a high-quality image with suppressed noises can be obtained.

Next, at the timing 406, when the signal reading is completed, the camera 1 returns to "LV" and is in the operation standby state. This operation standby state is the same as that performed at the timings 402 and 403 described above.

Next, at the timing 407, when the state of the camera 1 shifts to the "motion image" (third state) in response to the user's switching operation to the motion image capturing mode, capturing and recording of the motion images start. From the timing 407 to the timing 408, the user manually holds the camera 1 and captures an image. In this "motion image", the image sensor 6 continuously performs charge accumulations and signal reading, and the image stabilization unit 14 performs the image stabilizing operation ("ON"). The acquired image is recorded in the memory 8. At this time, the energization to the image stabilization unit 14 is controlled by the first energization method. This is because the influence of the image blurs is greater than the influence of the noises on the image, and the image stabilization performance is prioritized to the noise reduction. This configuration can provide a high-quality image (video) with reduced image blurs.

Next, at the timing 408, the user fixes the camera 1 onto the tripod and captures a motion image until the timing 409. Whether or not the camera 1 is fixed onto the tripod can be determined, for example, based on a state in which the shake signal from the shake sensor 15 is smaller than a predetermined value for a predetermined period or longer. In the fixing state on the tripod, the image blurs due to the camera shake or the like are unlikely to occur, and the camera shake becomes smaller than a predetermined value requiring the image stabilizing operation. Thus, even if it is a "motion image", the image stabilizing operation of the image stabilization unit 14 is unnecessary, and only holding the self-weight of the movable part ("center") is necessary. Therefore, when the camera shake is smaller than the predetermined value in the "motion image", the second energization method controls energizing the image stabilization unit 14. This is because when the camera 1 is fixed onto the tripod, no image stabilization performance is required and the noise reduction is prioritized. Thereby, a high-quality image with suppressed noises can be obtained. Even in the still image capturing mode, when the camera 1 is fixed onto the tripod, the second energization method may be used to control energizing the image stabilization unit 14 so as to maintain the self-weight of the movable part.

At the timing 409, the camera 1 is powered off.

Figure 10:
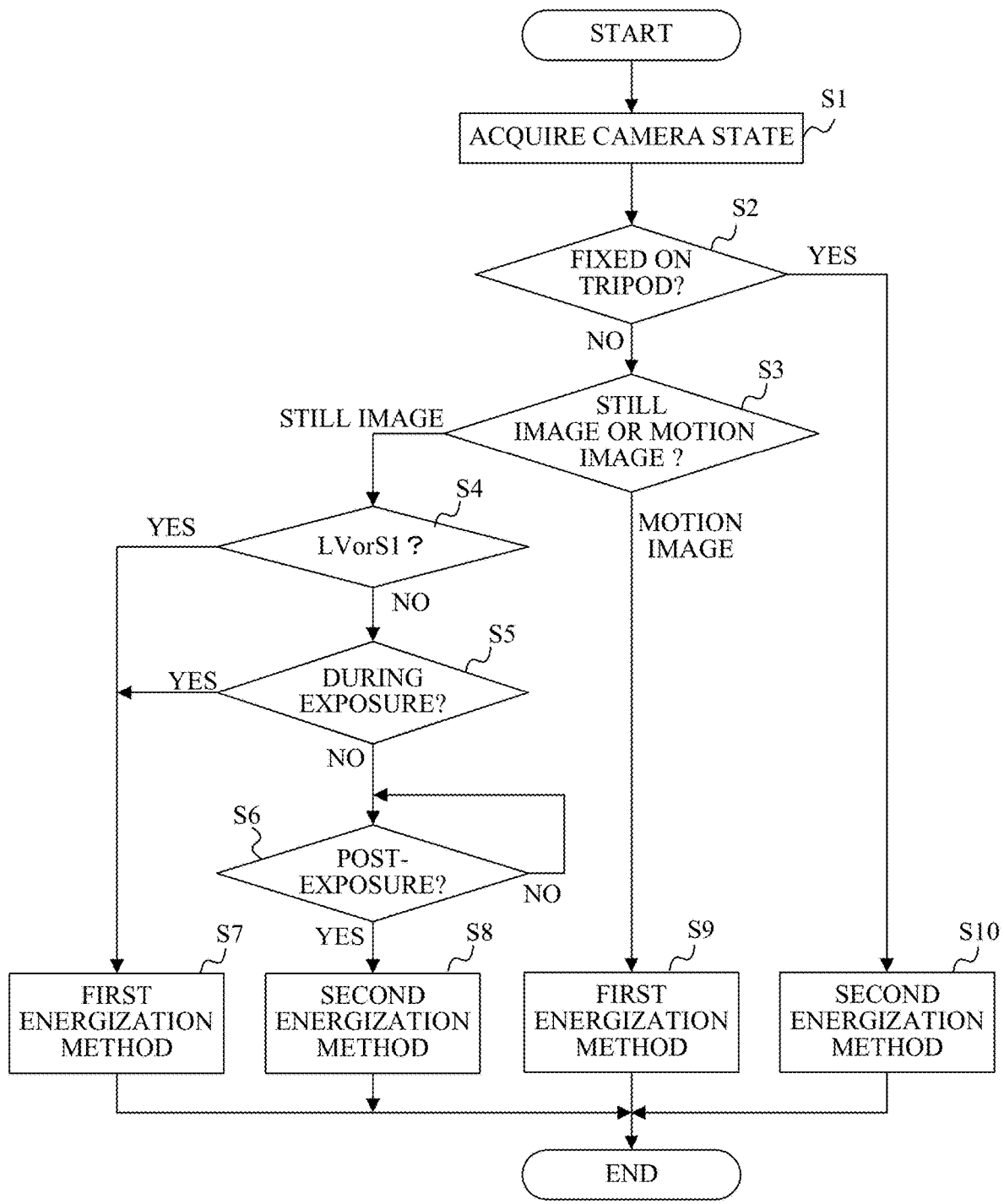
FIG. 10 is a flowchart showing processing executed by a camera controller in the image pickup apparatus according to the embodiment.

The flowchart in FIG. 10 illustrates processing (control method) for selecting (setting) a communication method executed by the camera controller 5. The camera controller 5 as a computer executes this processing according to a computer program.

In the step (abbreviated as S in the FIG. 1, the camera controller 5 acquires the state of the camera 1. Next, in the step 2, it determines based on the above method whether or not the camera 1 is fixed onto the support member such as the tripod, and if it is fixed onto the supporting member, the flow proceeds to the step 10, otherwise, the flow proceeds to the step 2. In the step 10, the camera controller 5 selects the second energization method and ends this processing.

In the step 3, the camera controller 5 determines whether the image capturing mode is the still image capturing mode or the motion image capturing mode, and the flow proceeds to the step 4 in the case of the still image capturing mode, and to the step S9 in the case of the motion image capturing mode. In the step 9, the camera controller 5 selects the first energization method and ends this processing.

In the step 4, the camera controller 5 determines whether or not the camera 1 is "LV" or "S1" illustrated in FIG. 9A to 9E. If it is LV or S1, the flow proceeds to the step 7, and if not, the flow proceeds to the step 5.

In the step 5, the camera controller 5 determines whether or not the camera 1 is in the "exposure". If it is in the "exposure", the flow proceeds to the step 7, and if not, the flow proceeds to the step 6. In the step 7, the camera controller 5 selects the first energization method and ends this processing.

In the step 6, the camera controller 5 determines whether or not the camera 1 is in the "post-exposure". If it is in the "post-exposure", the flow proceeds to the step 8; otherwise, the determination in the step 6 is repeated. In the step 8, the camera controller 5 selects the second energization method and ends this processing.

This embodiment switches the energization method for the image stabilization unit 14 according to the operation sequence of the camera 1, and thereby can obtain a high image stabilization performance while reducing noises in the image.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2019-128135, filed on Jul. 10, 2019, which is hereby incorporated by reference herein in its entirety.

What is claimed is:

1. An image pickup apparatus comprising:
an image sensor configured to capture an object image; and
one or more processors and/or circuitry which functions as a controller by controlling energizing an actuator for an image stabilization operation that moves the image sensor,
wherein the controller
switches an energization method for the actuator between a first energization method and a second energization method wherein a response distortion of the actuator in the second energization method is larger than a response distortion of the actuator in the first energization method, and wherein a ripple current in the second energization method is smaller than a ripple current in the first energization method,
controls energizing the actuator by the first energization method in a first state that does not read a signal out of the image sensor during a charge accumulation of the image sensor, and
controls energizing the actuator by the second energization method in a second state that reads the signal out of the image sensor after the charge accumulation.

2. The image pickup apparatus according to claim 1, wherein the controller controls energizing the actuator by the first energization method in a third state that reads the signal out of the image sensor during the charge accumulation of the image sensor.

3. The image pickup apparatus according to claim 2, wherein in the third state, the controller controls energizing the actuator by the first energization method when a shake of the image pickup apparatus is larger than a predetermined value, and controls energizing the actuator by the second energization method when the shake is smaller than the predetermined value.

4. The image pickup apparatus according to claim 1, wherein the controller controls energizing the actuator by the second energization method when the image pickup apparatus is fixed by a support member.

5. The image pickup apparatus according to claim 1, wherein the controller controls energizing the actuator by the second energization method so that the image sensor is held at a predetermined position.

6. The image pickup apparatus according to claim 1, wherein the first energization method is an energization method that alternates two voltages having different signs and applies them to the actuator, and
wherein the second energization method is an energization method that alternates three voltages including two voltages having different signs and 0 volt and applies them to the actuator.

7. A control method of an image pickup apparatus for controlling energizing an actuator for an image stabilization operation that moves an image sensor configured to capture an object image, the image pickup apparatus being configured to switch an energization method for the actuator between a first energization method and a second energization method, wherein a response distortion of the actuator in the second energization method is larger than a response distortion of the actuator in the first energization method, and wherein a ripple current in the second energization method is smaller than a ripple current in the first energization method, the control method comprising:
controls energizing the actuator by the first energization method in a first state that does not read a signal out of the image sensor during a charge accumulation of the image sensor, and
controls energizing the actuator by the second energization method in a second state that reads the signal out of the image sensor after the charge accumulation.

8. A non-transitory computer-readable storage medium storing a program for causing a computer in an image pickup apparatus for controlling energizing an actuator for an image stabilization operation that moves an image sensor an image sensor configured to capture an object image, the image pickup apparatus being configured to switch an energization method for the actuator between a first energization method and a second energization method,
wherein a response distortion of the actuator in the second energization method is larger than a response distortion of the actuator in the first energization method, and
wherein a ripple current in the second energization method is smaller than a ripple current in the first energization method,
wherein the control method includes:
controls energizing the actuator by the first energization method in a first state that does not read a signal out of the image sensor during a charge accumulation of the image sensor, and
controls energizing the actuator by the second energization method in a second state that reads the signal out of the image sensor after the charge accumulation.

* * * * *